United States Patent [19]

Tittl

[11] Patent Number: 4,997,287
[45] Date of Patent: Mar. 5, 1991

[54] METHOD AND APPARATUS FOR DETECTING THE TEMPERATURE OF AN OBJECT ON A COORDINATE MEASURING APPARATUS

[75] Inventor: Jakob Tittl, Sontheim/Brenz, Fed. Rep. of Germany

[73] Assignee: Lab Products, Inc., Maywood, N.J.

[21] Appl. No.: 369,517

[22] Filed: Jun. 21, 1989

[30] Foreign Application Priority Data

Jul. 9, 1988 [DE] Fed. Rep. of Germany ....... 3823373

[51] Int. Cl.$^5$ ..................... G01K 1/14; G01K 13/00; G01D 3/04

[52] U.S. Cl. .................... 374/141; 374/142; 33/702; 33/DIG. 19; 33/560

[58] Field of Search ................ 33/503, 504, 556, 557, 33/558, 559, 560, 561, DIG. 19, 702, 704; 374/141, 142

[56] References Cited

U.S. PATENT DOCUMENTS

| | | | |
|---|---|---|---|
| 2,956,344 | 10/1960 | Rantsch | 374/141 |
| 3,142,120 | 7/1964 | Mottu | 33/702 |
| 3,332,153 | 7/1967 | Loewen | 33/702 |
| 4,637,119 | 1/1987 | Schneider et al. | 33/561 |

FOREIGN PATENT DOCUMENTS

| | | |
|---|---|---|
| 1015614 | 9/1957 | Fed. Rep. of Germany . |
| 3013378 | 10/1981 | Fed. Rep. of Germany . |
| 3620118 | 12/1987 | Fed. Rep. of Germany . |
| 3729644 | 3/1989 | Fed. Rep. of Germany ........ 33/702 |
| 0103367 | 8/1979 | Japan ..................... 33/704 |

OTHER PUBLICATIONS

International Patent Application PCT/GB86/00551 (WO87/01798), Mar. 1987.
Product Publication 60-20-027-d Entitled "Tasterwechseleinrichtungen" of Carl Zeiss (1986).

Primary Examiner—William A. Cuchlinski, Jr.
Assistant Examiner—Diego F. F. Gutierrez
Attorney, Agent, or Firm—Blum Kaplan

[57] ABSTRACT

A method for detecting temperature of an object to be measured such as a workpiece mounted on a coordinate measuring apparatus having a movable measuring arm. The measuring apparatus includes a sensing pin or a complete sensing head as well as a temperature sensor. For measuring temperature, the sensing pin or sensing head is exchanged for the temperature sensor having the same kind of holder as the sensing pin. Thereafter, the temperature sensor is moved to the object by the measuring arm of the apparatus and is placed in contact therewith. The registered temperature measurement values are used to correct the lengths and spacings measured with the coordinate measuring apparatus. The entire temperature and coordinate measuring operation is carried out completely automatically by the CNC control of the apparatus without the aid of operating personnel. A temperature sensor for carrying out the method is also disclosed.

3 Claims, 3 Drawing Sheets

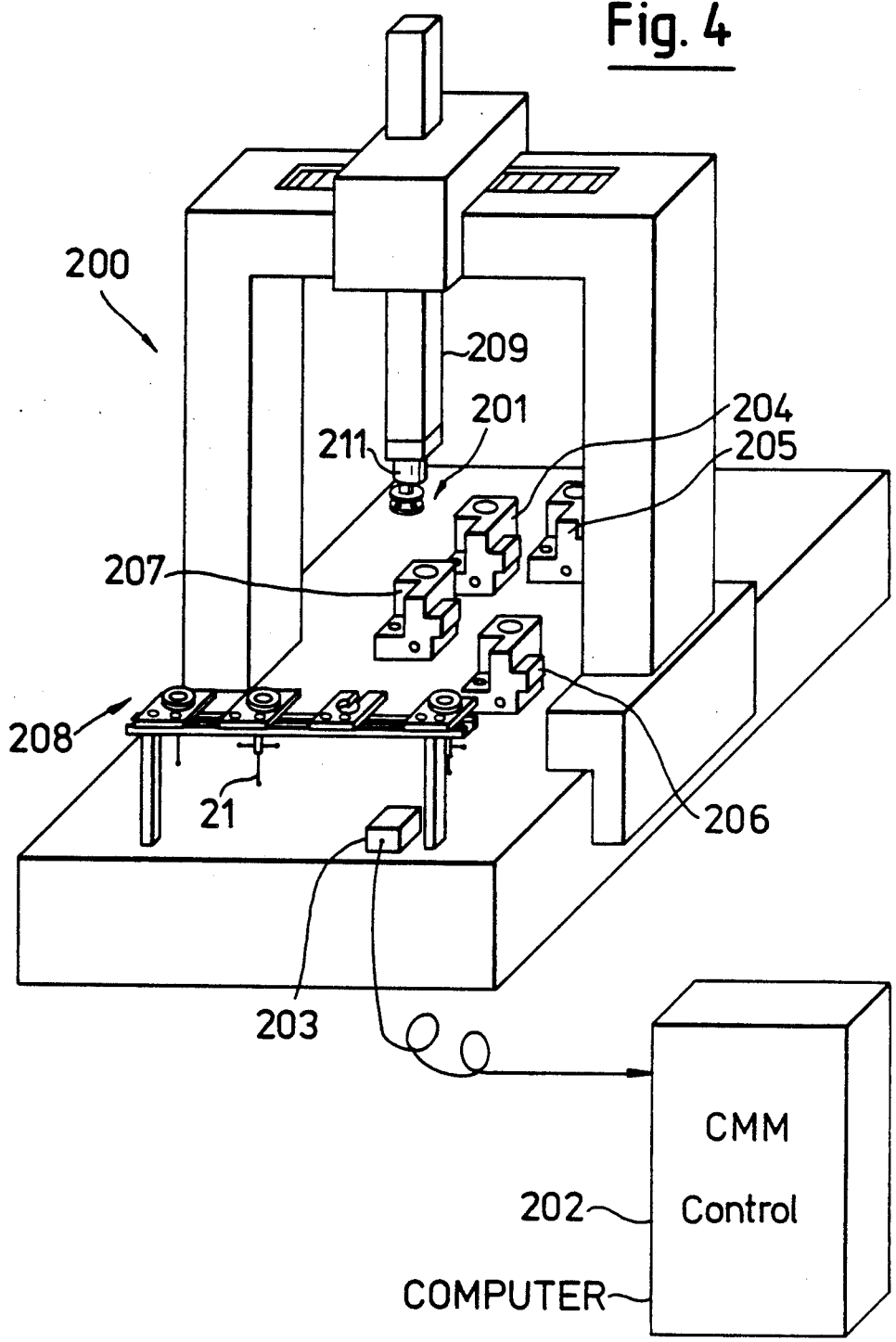

METHOD AND APPARATUS FOR DETECTING THE TEMPERATURE OF AN OBJECT ON A COORDINATE MEASURING APPARATUS

BACKGROUND OF THE INVENTION

In coordinate measurement technology, the temperature of a workpiece to be measured by the coordinate measuring apparatus must be detected to approximately 0.1 K for precise length measurements. Known contactless operating temperature sensors have up to now not been capable to detect temperatures with this precision. Therefore, contact thermometers have been applied to the object to be measured by operating personnel for detecting temperature. Precision resistors are used which are connected to an evaluation circuit of the coordinate measuring apparatus. The measurement values of these precision resistors are used together with the measurement values of further contact thermometers permanently installed on the scales of coordinate measuring apparatus for correcting the length measurement values of the workpiece to the dimensions applicable for a reference temperature of 20° C. Such a method is disclosed for example in published German patent application DE 36 20 118 A1.

The known method of temperature detection therefore requires the presence of an operating person who applies the contact thermometer to the workpiece or object. Coordinate measuring apparatus are now increasingly used in production measurement operation in order to measure a larger number of workpieces fed continuously via a handling system or mounted on a measuring table. This production measuring operation can for example be a computerized numerical control (CNC) in a night shift without personnel in attendance. The temperature compensation of the coordinate measuring values cannot take place continuously during the shift since the temperature is measured only once in advance of the shift. A change in the temperature of the workpiece to be measured during the shift leads inexorably to a measurement error.

Published German patent application DE 36 20 118 A1 also discloses that the temperature detection can be automated for workpieces which are to be measured within a flexible manufacturing system. This automatization is achieved by installing a reference body (gauge block) on the pallet of the workpiece. This gauge block passes through the manufacturing process together with the workpiece and therefore takes on the same temperature. The coordinate measuring apparatus then detects the temperature of the workpiece to be measured via a length measurement on this reference body.

Although this method of temperature detection is suitable for workpieces in the manufacturing area, it does however present disadvantages in the series measurement operation. Error influences caused by temperature gradients in the measurement region of the coordinate measuring apparatus or within the workpiece itself cannot be detected because the temperature at the workpiece itself is not directly measured in a series measurement operation.

A method is disclosed in German Patent 3,013,378 wherein workpieces are automatically fed to a measuring arrangement provided with a temperature sensor and are measured with respect to their spatial dimensions and their temperature. The known method is however poorly suited when workpieces having different geometries are to be automatically measured. A complex handling system is then required in order to bring the temperature sensor in contact with the workpiece.

SUMMARY OF THE INVENTION

It is an object of the invention to provide a method for detecting the temperature of objects to be measured on a coordinate measuring apparatus which permits an automatic operation without attending personnel and to provide a reliable and precise detection of measured values with the least amount of effort.

The method of the invention is for detecting the temperature of an object or workpiece to be measured on a coordinate measuring apparatus. The apparatus has a computer, a movable measuring arm and a magazine for holding components of the apparatus with the magazine being disposed at the periphery of the apparatus. The method includes the steps of: moving the measuring arm with a coordinate measuring sensor component releasably engaged therewith to the magazine; dropping the coordinate measuring sensor component off in the magazine and exchanging the same for a temperature sensor component so that the latter is now releasably engaged with the measuring arm; moving the temperature sensor component releasably engaged with the measuring arm into contact with the object and maintaining the contact for a predetermined time duration; transmitting the measured values of temperature detected by the temperature sensor component to the computer of the coordinate measuring apparatus; and then, moving the temperature sensor component with the measuring arm back to the magazine and exchanging the same for the coordinate measuring sensor component.

According to a feature of the invention, the sensor for detecting the workpiece temperature is brought into contact with the workpiece neither by an attending person nor by a complex additional handling system; instead, the sensor is brought into contact with the workpiece by the measuring arm of the coordinate measuring apparatus itself. This takes place in that the sensing pin usually used for the coordinate measurements or the entire sensing head is exchanged for a temperature sensor. On the one hand then, the method presupposes the use of a coordinate measuring apparatus which has an automatic sensing pin exchange unit and requires, on the other hand, that the temperature sensor held in operational readiness in lieu of the sensing pin is provided with a holder which corresponds in its form to the holder of the exchangeable coordinate measuring sensing pin.

Coordinate measuring apparatus with automatic sensing pin exchange units are known per se and are described, for example, in the product information bulletin number 60-20-027-d published in 1986 under the title "Tasterwechseleinrichtungen" by Carl Zeiss, an organization doing business in the Federal Republic of Germany. Such apparatus are also disclosed in European Patent publication 01 28 464 as well as in U.S. Pat. No. 4,637,119 corresponding thereto. Such exchange units include a magazine disposed in the measuring region of the coordinate measuring apparatus wherein the different exchangeable sensing elements are stored. The additional effort needed for an automatic temperature measurement with such a system then simply involves hanging a temperature sensor with an appropriate mounting into this magazine and to integrate the corresponding exchange operations and sensing operations with the temperature sensor into the control program for the coordinate measuring apparatus.

The sensor with its contact surface is resiliently attached to the holder by means of which it is connected to the coordinate measuring apparatus so that a reliable contact can be made with the temperature sensor on the workpiece surface inclined with respect to the machine axes. In addition, it is advantageous to attach the sensor to the holder so that it is rotatable or pivotable. The sensor can then be aligned in advance with respect to the side of the workpiece to be contacted.

BRIEF DESCRIPTION OF THE DRAWINGS

The invention will now be described with reference to the drawings wherein:

FIG. 3b is a plan view of the holder of the temperature sensor of FIG. 3a; and,

FIG. 4 is a perspective view of a complete coordinate measuring apparatus in which a temperature sensor according to a third embodiment of the invention has been exchanged.

DESCRIPTION OF THE PREFERRED EMBODIMENTS OF THE INVENTION

Figure 1:
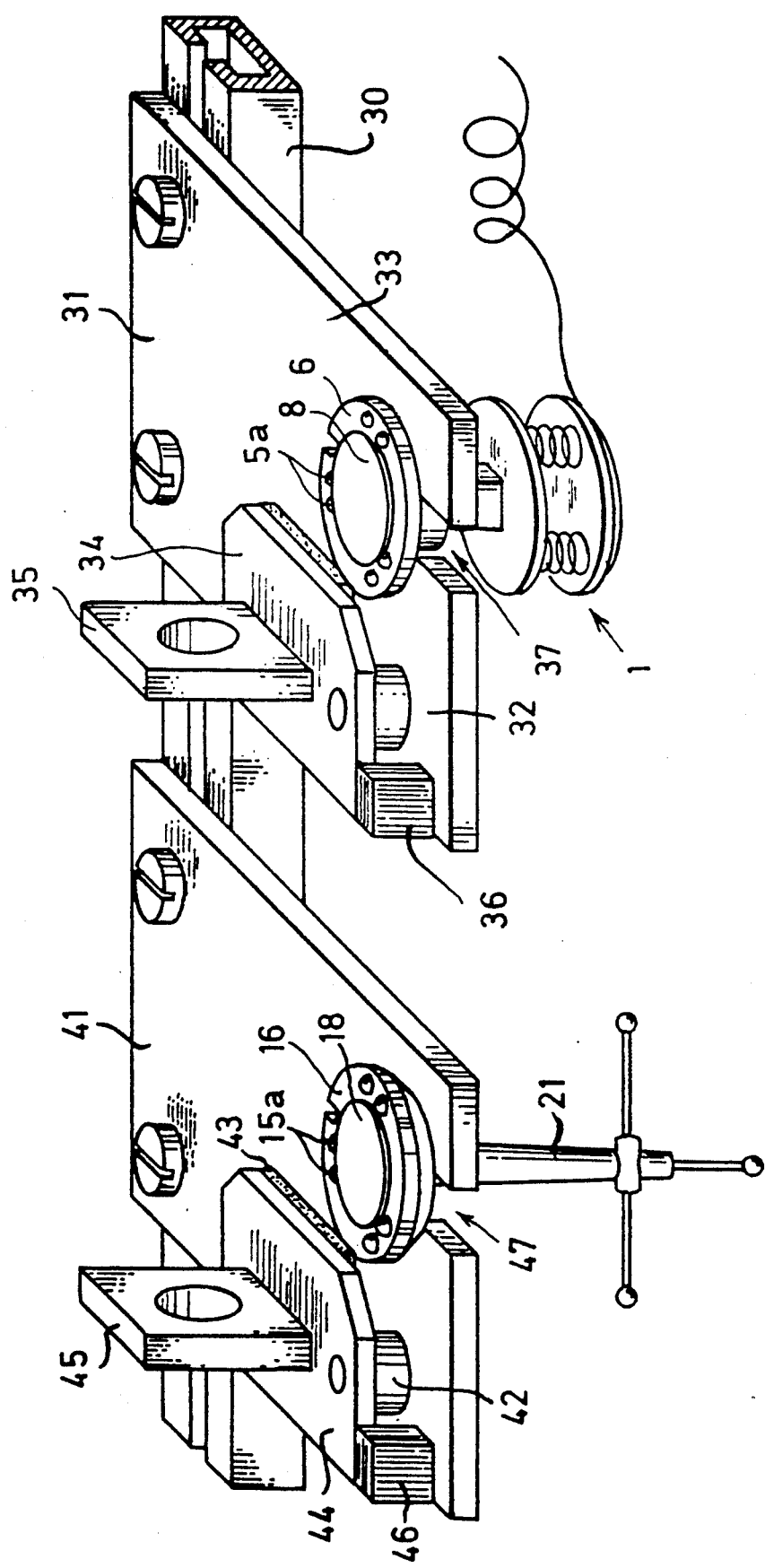
FIG. 1 is a perspective schematic of a portion of the magazine in which the coordinate measuring sensor and a temperature sensor are held in operational readiness.

The magazine shown in FIG. 1 corresponds in its configuration to the magazine of the sensor exchange unit described in U.S. Pat. No. 4,637,119 incorporated herein by reference. The magazine is described in detail in this patent and the following description makes reference thereto.

An exchangeable sensor pin combination 21 is hooked into one of the two magazine positions which in FIG. 1 is position 47. The sensing pin combination 21 includes a holder 16 in the form of a rotatable part 16 in which a three-point bearing is fitted. The three-point bearing is comprised of the three pairs of balls 15a by means of which the sensing-pin combination 21 engages the corresponding bearing support in the sensing head of the coordinate measuring apparatus. A steel plate 18 fitted into the rotatable part 16 acts as an armature for the electromagnetic holding device located in the sensing head.

A temperature sensor 1 is hooked into the second magazine position 37. This temperature sensor 1 has the same holder 6 as the sensing-pin combination 21. The holder 6 includes corresponding bearing balls 5a and a corresponding steel plate 8.

Figure 2:
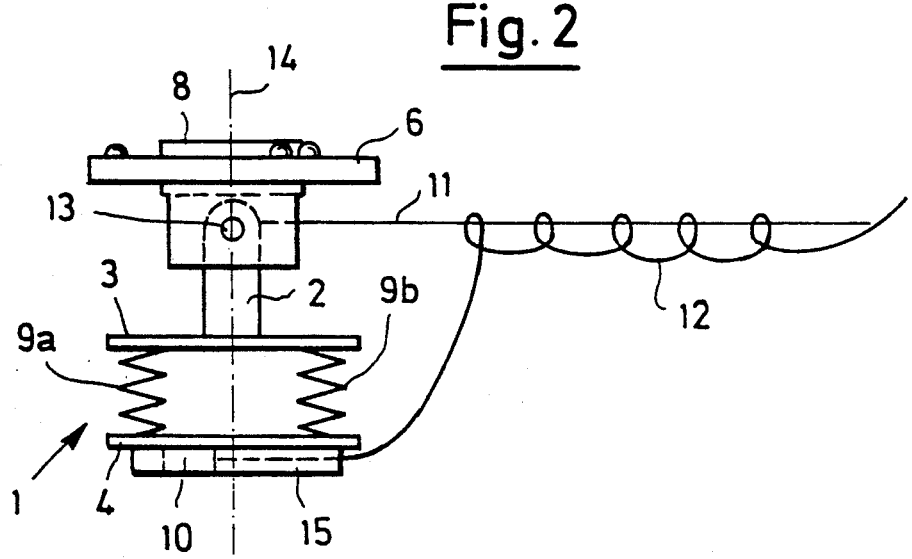
FIG. 2 is a schematic side elevation view of the temperature sensor shown in FIG. 1.

As shown in the side elevation view of FIG. 2, the actual measuring component 10 of the temperature sensor is embedded in a contact plate 15.

This contact plate assures the heat transfer from the workpiece to the sensor itself and therefore has a good heat conductivity and a low heat capacity. A thin copper disc can, for example, be used for this purpose. The copper disc is silver coated on the outside to keep out temperature radiation from the vicinity of the measuring component. The copper disc is attached to a first holding plate 4 via an insulating intermediate layer. The actual measuring component 10 itself can, for example, be a temperature sensor PT 100 (platinum resistor) as sold for example under the designation GR 2102 by the Degussa Company of Frankfurt, Federal Republic of Germany.

The first holding plate 4 is connected to a second holding plate 3 with the aid of four springs (9a, 9b). This resilient connection assures that the contact plate 15 can be set down on surfaces of the workpiece to be measured which are not precisely axially parallel.

The second holding plate 3 is, in turn, connected via a joint 2 so as to be rotatable about an axis 14 and is attached to the holder 6 so as to be pivotable about pin 13. In this way, the contact plate 15 can be coarsely prealigned with reference to the geometry of the workpieces to be measured.

The connecting cable 12 of the measuring component 10 is coiled many times about a wire 11 attached to the holder 6 in order to relieve tension loading. The cable 12 is connected with an appropriate electronic circuit for measuring temperature at the coordinate measuring apparatus.

Figure 3A:
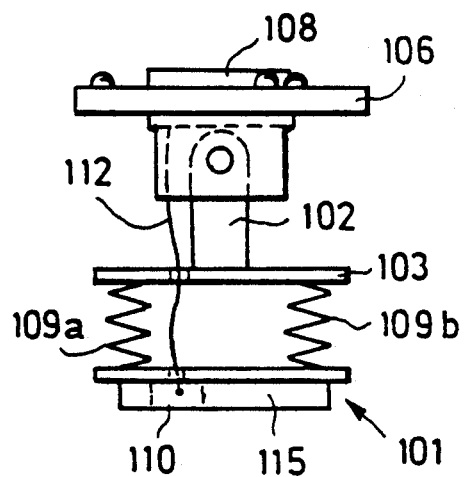
FIG. 3a is a side elevation view of another embodiment of a temperature sensor slightly modified when compared to the temperature sensor of FIG. 2.
Figure 3B:
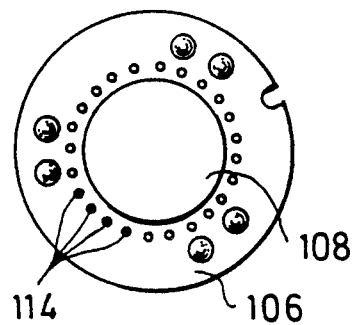

The embodiment shown schematically in FIGS. 3a and 3b can also be used for transmitting the signals of the measuring component 10.

In the embodiment shown in FIGS. 3a and 3b, a plurality of contact pins 114 are provided at the peripheral edge of the exchanging surface of the holder 106. The connecting cables 112 of the measuring component 110 are, for example, connected to the contact pins 114. These pins conduct the measurement signals to corresponding countercontacts at the receiver on the measuring arm of the coordinate measuring apparatus. The embodiment described with reference to FIGS. 3a and 3b is suitable especially for the case wherein the coordinate measuring apparatus is not equipped with an exchanging unit for the sensing pins and is instead equipped with an exchanging unit for complete sensing heads which anyhow require connectors for supply voltages and for transmitting the sensing signal further and the like.

In addition to the possibilities illustrated here of the direct transmission of the measurement signal of the temperature sensor via cables, it is also possible to provide for a wireless transmission of the signal of the measurement component to the coordinate measuring apparatus. In this case, the temperature sensor has its own voltage supply in the form of a battery as well as a suitable transmitter for transmitting the measured value.

The operation of detecting temperature with such a temperature sensor will be described below with respect to FIG. 4.

The coordinate measuring apparatus 200 shown in FIG. 4 has a magazine 208 within its measuring region. In this magazine 208, several exchangeable sensing pins as well as a temperature sensor 201 are held in operational readiness. When a temperature measurement is to be made on one of the four workpieces (204, 205, 206 or 207) secured to the table, the measuring arm 209 travels to the magazine 208 and places the sensing pin which was needed in the previous coordinate measuring program, into one of the vacant magazine positions. Thereafter, the temperature sensor 201 is taken out of the magazine 208 in the course of the automatic exchange operation and, in lieu of the sensing pin just set down, the temperature sensor is tightly engaged in the sensing head 211 which is attached to the lower end of the measuring arm 209.

The measuring arm moves in correspondence to the programmed measuring operation with the temperature sensor 201 to the workpiece whose temperature is to be measured. Here, the measuring arm applies the even contact plate having the temperature measuring element to one of the even surfaces of the workpiece. The contact plate is located at the lower end of the sensor 201. This case is illustrated in FIG. 4.

The contact between the measuring element and the workpiece must be maintained for a period of time so that the measuring element can take on the temperature of the workpiece. This time period is dependent upon the response time of the measuring element or of the heat capacity of the contact plate on the lower side of the sensor and can be predetermined by means of experimentation. With the configuration of the sensor shown in FIG. 2, contact times of less than six seconds and a measurement precision for a temperature of 5°/100° C. can be obtained.

The temperature measurement values are then transmitted wirelessly to a corresponding remote station 203 by a unit (not shown) on the temperature sensor 201. The remote station 203 is connected with the control 202 of the coordinate measuring apparatus. In this connection, it should be mentioned that it is advantageous to detect and store the measured values of temperature during the entire contact operation. The different measured values can then be subjected to a plausibility check which permits a statement to be made that the sensor was actually in contact with the workpiece. This can be recognized in that the temperature converges from a previously constant value corresponding to air temperature to a somewhat different temperature value of the workpiece during the contact.

After the temperature detection is completed, the measuring arm 209 again moves to the magazine 208 and there exchanges the temperature sensor 201 and takes up the appropriate sensing pin required for the actual coordinate measuring program.

All coordinate measurements on the workpiece 204 which are thereafter carried out with the aid of the sensing pin are then so corrected with the aid of a corresponding computer program that they correspond to the dimensions of the workpiece at the reference temperature of 20° C.

Thus, the measured values of temperature are used, for example, to automatically correct length measurement values of the measuring object detected by the coordinate measuring sensor component. The measured values of temperature of the temperature sensor component are detected both before and during the contact of the temperature sensor component with the measuring object and the measured values of temperature are subjected to a plausibility check in advance of the correction of the length measurement values.

It is understood that the foregoing description is that of the preferred embodiments of the invention and that various changes and modifications may be made thereto without departing from the spirit and scope of the invention as defined in the appended claims.

What is claimed is:

1. Method for detecting the temperature of an object to be measured on a coordinate measuring apparatus, the apparatus having a computer, a movable measuring arm and a magazine for holding components of the apparatus, the magazine being disposed at the periphery of the apparatus, the method comprising the steps of:
   moving the measuring arm with a coordinate measuring sensor component releasably engaged therewith to the magazine;
   dropping the coordinate measuring sensor component off in the magazine and exchanging the same for a temperature sensor component so that the latter is now releasably engaged with the measuring arm;
   moving the temperature sensor component releasably engaged with the measuring arm into contact with the object and maintaining the contact for a predetermined time duration;
   transmitting the measured values of temperature detected by the temperature sensor component to the computer of the coordinate measuring apparatus; and then,
   moving the temperature sensor component with the measuring arm back to the magazine and exchanging the same for the coordinate measuring sensor component.

2. The method of claim 1, wherein the measured values of temperature are used for automatically correcting length measurement values of the measuring object detected by the coordinate measuring sensor component.

3. The method of claim 2, wherein measured values of temperature of the temperature sensor component are detected both before and during the contact of the temperature sensor component with the measuring object; and, subjecting the measured values of temperature to a plausibility check in advance of the correction of the length measurement values.

* * * * *

UNITED STATES PATENT AND TRADEMARK OFFICE
CERTIFICATE OF CORRECTION

PATENT NO. : 4,997,287

DATED : March 5, 1991

INVENTOR(S) : Jakob Tittl

It is certified that error appears in the above-identified patent and that said Letters Patent is hereby corrected as shown below:

In the title page, item 73: delete "Lab Products, Inc., Maywood, N.J." and substitute -- Carl-Zeiss-Stiftung, Oberkochen, Fed. Rep. of Germany -- therefor.

In the title page, under Attorney, Agent, or Firm: delete "Blum Kaplan" and substitute -- Walter Ottesen -- therefor.

In column 5, line 16: delete "5°/100°C." and substitute -- 5/100°C -- therefor.

Signed and Sealed this

Twenty-seventh Day of April, 1993

Attest:

MICHAEL K. KIRK

*Attesting Officer*  *Acting Commissioner of Patents and Trademarks*